UNITED STATES PATENT OFFICE.

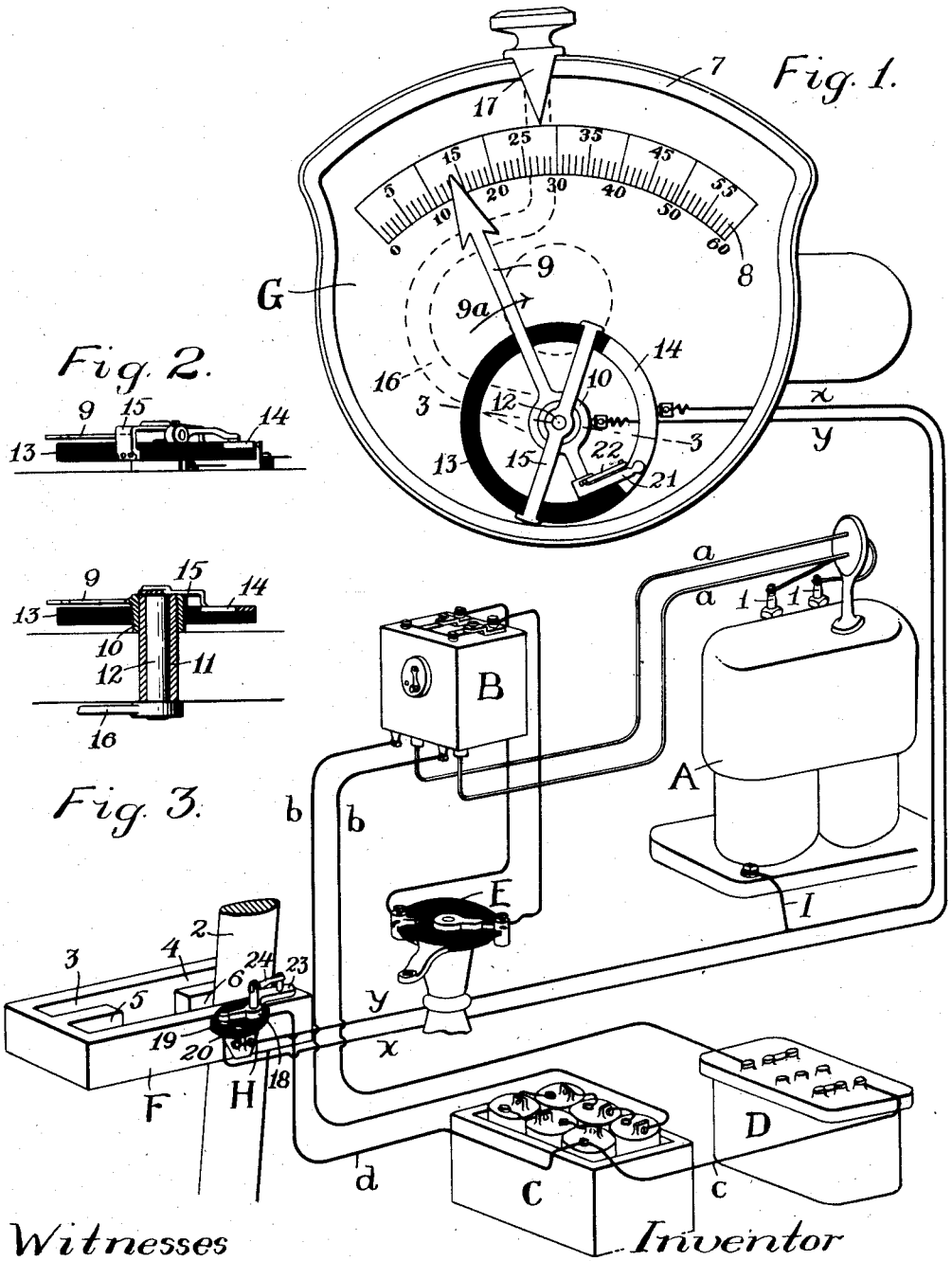

THEOPHILUS BROWN, OF WORCESTER, MASSACHUSETTS.

AUTOMATIC SPEED CONTROL.

977,703.

Specification of Letters Patent. Patented Dec. 6, 1910.

Application filed December 26, 1907. Serial No. 408,036.

*To all whom it may concern:*

Be it known that I, THEOPHILUS BROWN, a citizen of the United States, residing at Worcester, in the county of Worcester and Commonwealth of Massachusetts, have invented a new and useful Improvement in Automatic Speed Control, of which the following is a specification, accompanied by drawings forming a part of the same, in which—

Figure 1 is a diagrammatic view of the electric wiring of an explosion motor, with the parts of the motor in perspective and the speed dial in enlarged front view. Fig. 2 is a detached view of the circuit breaking ring on the speed dial, in Fig. 1, and Fig. 3 is a sectional view of the same on line 3—3, Fig. 1, with the connecting wires omitted.

Similar reference letters and figures refer to similar parts in the different views.

My invention relates to an automatic speed control for an explosion engine, and is more especially designed for use in automobiles, the object being to enable the limit of the speed of an automobile to be set at a definite point and to reduce automatically the speed of the motor whenever that point is reached.

My invention comprises means for preventing the formation of an electric spark in the cylinder of the motor during the entire period in which the automobile exceeds the predetermined speed, and it consists in the construction and arrangement of parts as hereinafter described and pointed out in the annexed claim.

Referring to the accompanying drawings A represents a two cylinder motor, having spark plugs 1, 1, connected by wires $a$, $a$, with the induction coil B, which is connected by wires $b$, $b$, with one pole of batteries C and D.

E is a circuit closer arranged to govern the time of the production of the spark in the cylinder A through the spark plugs 1, 1.

F is the change speed device provided with a lever 2, and compartments 3, 4, 5 and 6 to receive the lever 2 when the engine is connected through different gears. The compartment 6 receives the lever 2 at the highest speed, the compartments 4 and 5 at lower speeds and the compartment 3 at reverse. The lever 2 stands in the drawings in the high speed compartment 6.

G is a speedometer of the ordinary type, having a case 7 and graduated face 8 supported as desired, and provided with the usual gears and flexible shaft connection, not shown, with the wheels of the automobile.

All the above mechanism is of the ordinary and well known construction and will not be further described.

Swinging over the dial face 8 is an indicating pointer 9 having a collar 10 mounted on a sleeve 11 on a stud 12. The sleeve 11 is rotated through gearing, not shown, and its movement corresponds with the speed of the automobile, which movement is indicated by the pointer 9 in the usual manner in speed indicating instruments. A ring 13 constructed of insulating material, as shown in Fig. 3, and provided on a portion of its upper surface with a metal plate 14, is supported by a diametrical arm 15 attached to the stud 12. To the lower end of the stud 12 is attached an arm 16 provided with an indicating finger 17 overlapping the edge of the dial face 8, and frictionally held against the edge of the case 7. Movement of the finger 17 will cause the movement of the arm 16, and the consequent change in relative position of any point on the ring with the pointer 9. From the other pole of the batteries in an ordinary motor, wires are conducted to the cylinders to complete the connection for the production of a spark at the spark plugs. In my present device I connect the other pole of the batteries with the cylinders through the speedometer G as follows:—Wires $c$ and $d$ lead to the lever 18 of the insulated switch H and the lever 18 of the switch H, as shown in Fig. 1, is arranged to be held, when the change speed lever 2 is in the high speed position upon the contact point 19, connected with the wire $x$. The electricity from the wires $c$ and $d$ therefore passes through the lever 18 and contact point 19 to wire $x$, the other end of which is electrically connected with the metal plate 14 on the ring 13. A wire $y$ is electrically connected to the collar 10 and to the cylinders at I, with the opposite end of the wire $y$ connected with the contact point 20.

I connect electrically the collar 10 to the plate 14 by an arm 21 pivoted on the end of indicator 9 and held in electrical contact with the ring 13 by a spring 22. This completes the connection and the electricity from wires $c$ and $d$ passes to the cylinder at I through lever 18, contact point 19, wire $x$, plate 14, arm 21, indicator 9, collar 10 and wire $y$. By setting the finger 17 at any desired speed limit, the ring 13 is thereby turned so that the arm 21 is drawn from the plate 14 onto the insulated ring 13 when the indicator 9, moving in the direction indicated by the arrow 9a in Fig. 1, reaches the speed limit at which the finger 17 is set, and the connection through the arm 21 between wires $x$ and $y$ and between the batteries and the cylinder is thereby broken. As the electricity is now cut off from the cylinders the motor runs by its own momentum, until by the decrease in speed and consequent movement of the indicator lever 9, in the opposite direction to that indicated by the arrow 9a, the arm 21 is again brought into contact with the plate 14, the connection reëstablished and explosions again occur in the motor. I also provide means for disconnecting my speed control except when the highest speed gear is used. The switch lever 18 is held on the contact point 19 by the position of the change speed lever 2 in the high speed compartment in contact with the spring actuated arm 23 of the lever 18. When the change speed lever 2 is thrown from the high speed compartment 6, the spring 24 throws the switch lever onto the contact point 20, from which the wire $y$ leads directly to the cylinder at I. In running the motor with low speed connection the finger 17 can be set at a speed which will insure a break in the electrical connection between the wires $x$ and $y$ at the ring 13, but even if connection at the ring should occur the other end of the wire $x$ would be dead at the insulated contact point 19. So that when the switch lever 18 is in contact with the point 20, the only electric circuit possible is directly to the cylinders at I through the wire $y$.

The course of the electric current to form the ignition spark in my improved speed contact is as follows:—From one pole of the battery wires $b$, $b$, and $a$, $a$, lead through the induction coil to the spark plugs. From the other pole of the battery, when the high speed gear is connected, wires $c$ and $d$ lead through the contact point 19 and the wire $x$ to the metal plate 14. The metal plate 14 is electrically connected when the speed is not above the predetermined limit through the arm 21, collar 10 and wire $y$ to the cylinder I, thereby completing the electrical circuit. When the indicator 9 is above the limit of speed, the arm 21 is drawn from the plate 14 and the circuit to the cylinder is broken, to be resumed when the indicator 9 returns below the indicated speed limit, and the connection is reëstablished through the arm 21. When the change speed lever is not in the notch for high speed, the course of electricity from the wires $c$ and $d$ is through the contact point 20 directly to the cylinders at I and my speed control is inoperative.

I claim,

In a speed control for explosion engines, the combination with an indicator for indicating the speed of a vehicle, means on said indicator for opening an electric circuit for preventing the formation of a spark in the cylinder of the engine to reduce the speed of the engine, a change speed lever arranged to occupy different positions corresponding to the different speeds of said vehicle and means acting automatically for cutting said indicator out of said circuit except when said lever is in the position of highest speed.

THEOPHILUS BROWN.

Witnesses:
HENRY WOOD FOWLER,
PENELOPE COMBERBACH.